United States Patent [19]

Crow

[11] 4,429,243
[45] Jan. 31, 1984

[54] COMPARTMENTIZED LEAD WIRE TERMINAL HOUSING FOR ELECTRIC MOTOR

[75] Inventor: William D. Crow, St. Louis, Mo.

[73] Assignee: Emerson Electric Co., St. Louis, Mo.

[21] Appl. No.: 400,747

[22] Filed: Jul. 22, 1982

[51] Int. Cl.³ ............................................. H02K 11/00
[52] U.S. Cl. .................................... 310/71; 174/138 F
[58] Field of Search ...................... 310/71, 85, 88, 89; 174/138 F; 200/296, 295; 248/27; 339/107, 128

[56] References Cited

U.S. PATENT DOCUMENTS 3,012,159 12/1961 Druesedow ........................... 310/71
3,350,586 10/1967 Otto ..................................... 310/71
3,502,917 3/1970 Bizoe ................................... 310/71
3,518,616 6/1970 Lewis .......................... 174/138 F X Primary Examiner—Mark O. Budd
Attorney, Agent, or Firm—Polster, Polster and Lucchesi

[57] ABSTRACT

A compartmentized lead wire terminal housing of electrical insulative material is provided for installation in the shell of a dynamoelectric machine (e.g., a fractional horsepower motor) in which male terminals connected to the windings of the motor are securely installed within separate compartments of the housing so as to enable female connectors on lead wire to be readily connected to the male winding terminals. The housing further has a lid which may be closed and locked in place thereby to enclose and protect the terminals.

9 Claims, 8 Drawing Figures

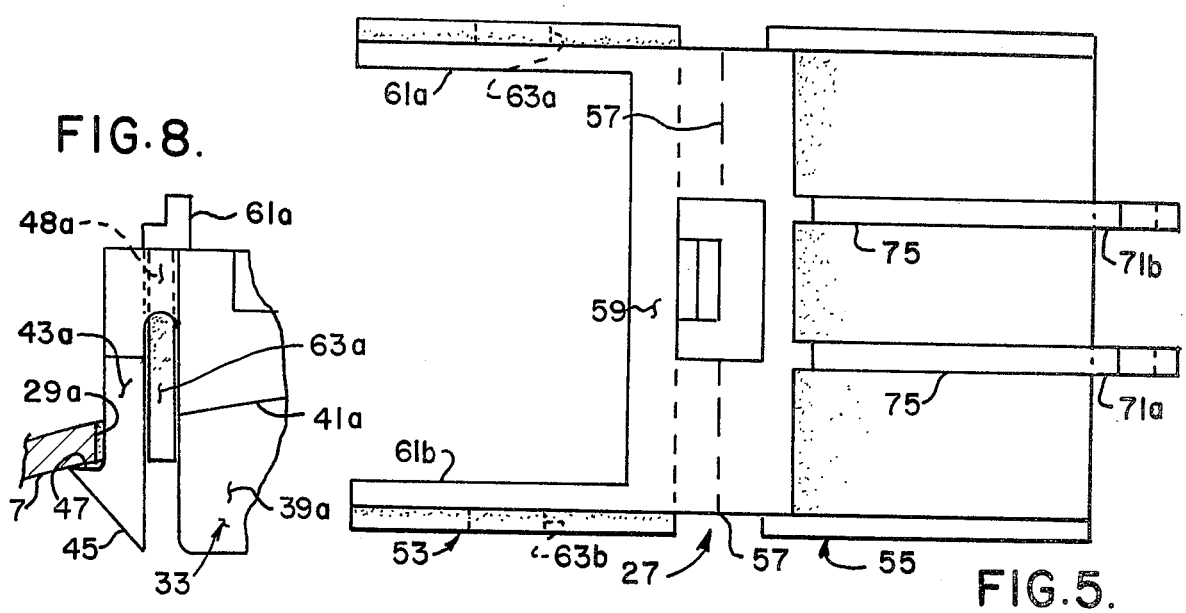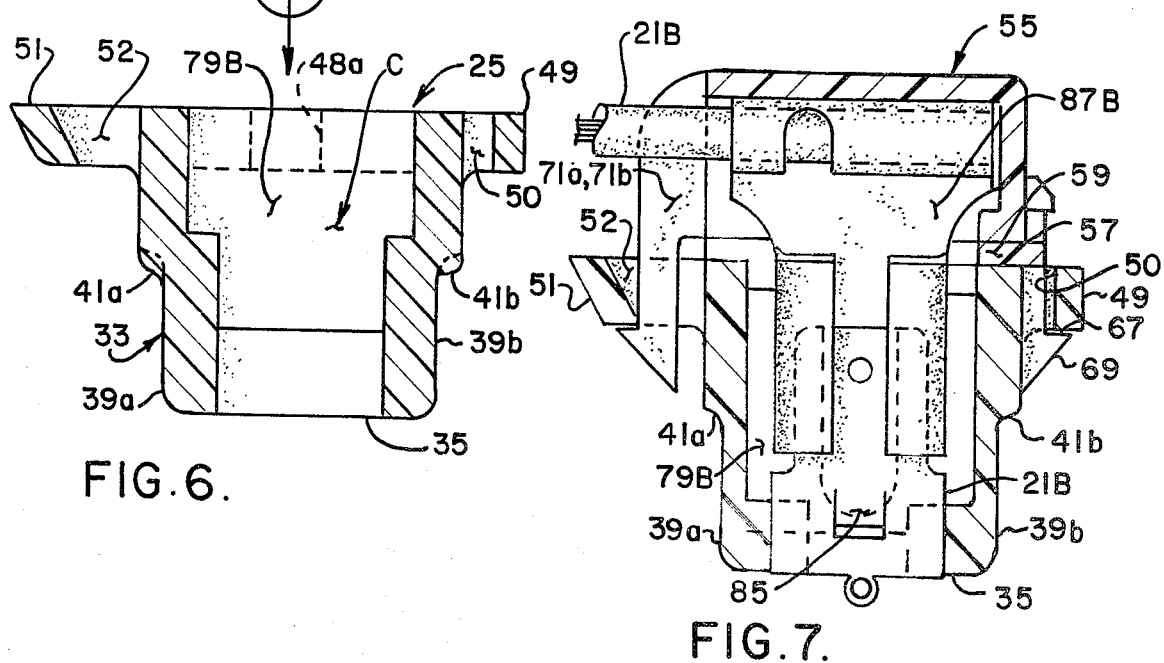

COMPARTMENTIZED LEAD WIRE TERMINAL HOUSING FOR ELECTRIC MOTOR

BACKGROUND OF THE INVENTION

This invention relates to a compartmentized lead wire terminal housing of electrical insulative material installable in the shell of an electric motor for securely holding electrical terminals connected to the windings of the motor in place within the housing and for permitting terminals on the lead wires for the motor to be readily connected to the terminals.

In a dynamoelectric machine, such as a fractional horsepower motor, it is oftentimes necessary to provide a ready means for connecting lead wires to the windings of the motor to permit energization of the motor and to control operation of the motor. Typically, the motor includes a stator assembly having one or more windings inserted therein and a rotor assembly rotatably mounted within the stator assembly. A cylindric shell surrounds the stator assembly and end shields or other bearing support members are fitted to the ends of the shell. The rotor assembly typically includes a rotor shaft which is journalled in bearings carried by the end shields. It is necessary that the lead wires from the winding of the stator assembly pass through the shell of the motor for connection to a source of electrical energy and for control of the motor. As is conventional, a lead wire passthrough opening may be provided in the shell of the motor at a convenient location. In certain instances, the lead wires to the motor are connected to the winding wires by means of wire nuts or the like. However, in other applications, it is desirable that a type of connection be made so as to permit the ready connection and removal of the lead wires to the windings of the motor. In the past, insulated housings or grommets were provided for the lead wires but these housings could be readily displaced from the motor housing and, in some instances, were difficult to install. Also, it is desirable that the winding terminals of the motor be clearly marked so that upon installation of the lead wires, the motor can be properly connected, depending on its intended voltage application and direction of rotation.

SUMMARY OF THE INVENTION

Among the several objects and features of this invention may be noted the provision of a compartmentized lead wire terminal housing for an electric motor or the like which may be readily installed in the lead wire passthrough opening of the motor and, once installed, which securely holds the winding terminals of the motor in place in separate insulated compartments;

The provision of such a lead wire terminal which may not readily be removed from the motor shell;

The provision of such a lead wire terminal housing which requires no special tools for installation;

The provision of such a lead wire terminal housing which electrically isolates and protects the terminals therein;

The provision of such a lead wire terminal housing which reduces potential shock hazards and which remains securely fastened within the lead wire passthrough opening of the motor shell even when the housing is partially disassembled for the installation or removal of lead wires from the winding terminals;

The provision of such a lead wire terminal in which the winding terminals for a motor are clearly marked and readily identifiable upon installation of the lead wires to the terminals;

The provision of such a lead wire terminal housing which is of rugged construction and thus which is able to withstand considerable forces being applied thereto via tension forces applied to the lead wires connected to the winding terminals installed within the lead wire terminal housing; and The provision of such a lead wire terminal housing which substantially closes the lead wire passthrough opening in the shell of the motor and which is of rugged and economical construction.

Other objects and features of this invention will be in part apparent and in part pointed out hereinafter.

Briefly stated, this invention relates to a dynamoelectric machine, such as a fractional horsepower motor or the like, which comprises a stator and a rotor. As is typical, the stator has a winding therein, a shell surrounding the stator, and at least one electrical terminal connected to the winding for the electrical connection of a selected electrical lead to the winding in a predetermined manner for operation of the motor. An opening is provided in the shell for the at least one terminals. Specifically, the improvement of this invention is defined to comprise a terminal housing installable in the opening in the shell, this housing comprising a receptacle and a cover. The receptacle is received within the opening and has at least one compartment therewithin for receiving a respective terminal. Further, the receptacle has a pair of sidewalls, and a pair of fingers, one at opposite sidewall of the receptacle, attached to the upper portion of this receptacle with each of the fingers being spaced from its adjacent sidewall of the receptacle. Each of the fingers has retaining means engageable with the shell when the receptacle is installed within the opening thereby to prevent removal of the receptacle from the opening. The fingers are flexibly movable between a retaining position in which the retaining means is engageable with the shell and a retracted position in which the receptacle may be inserted into the opening. The cover of the terminal housing has a base adapted to bear on the receptacle and a lid hingedly attached to the base. The lid is movable between an open position in which access may be had to the compartments in the receptacle and a closed position in which the lid overlies these compartments. The receptacle has a pair of apertures therein, one aperture adjacent each of the fingers, and the cover base has a pair of lugs insertable into the apertures after the receptacle has been inserted into the opening thereby to retain the fingers in their retaining position and to position the cover on the receptacle.

BRIEF DESCRIPTION OF THE DRAWINGS

FIG. 5 is a top plan elevational view of a cover for the terminal housing of the present invention illustrating a cover base and a lid hingedly connected to the cover base with the lid shown in its fully open position;

FIG. 6 is an exploded cross-sectional view of the receptacle and a side elevational view of the cover as the cover is applied to the receptacle; and FIG. 7 is a center longitudinal cross-sectional view taken along line 7—7 of FIG. 2 of the assembled terminal housing of the present invention illustrating the electrical terminals secured in place within the receptacle, illustrating female receptacles on the lead wires electrically connected to a respective male terminal within a separate compartment with the receptacle base, and illustrating the lid in its closed position thus enclosing and protecting the electrical terminals; and FIG. 8 is a view taken on line 8—8 of FIG. 3 showing the lefthand end of the receptacle (as viewed in FIG. 3) with the cover, as shown in FIG. 5, installed on the upper face of the receptacle and with a lug depending from the cover base being received in apertures in the upper face of the receptacle for preventing inward movement of means carried by the receptacle for securing the receptacle in place in the shell of the motor.

Corresponding reference characters indicate corresponding parts throughout the several views of the drawings.

DESCRIPTION OF A PREFERRED EMBODIMENT

Figure 1:
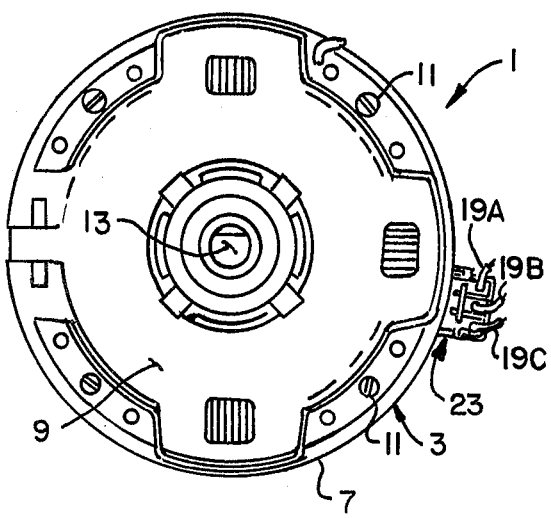
FIG. 1 is an end elevational view of a fractional horsepower motor having the terminal housing of the present invention inserted in the shell of the motor with lead wires inserted in the terminal housing of the present invention.

Referring now to the drawings, a dynamoelectric machine, and more specifically a fractional horsepower electric motor, is indicated in its entirety by reference character 1. As is typical, the motor includes a stator assembly, as generally indicated at 3, and a rotor assembly 5. The stator assembly typically includes a core C of suitable ferromagnetic laminations (not shown) having radial slots therein for receiving coils of suitable magnet wire for constituting the windings W of the motor. The stator core has a central bore B therethrough into which the rotor assembly is fitted with the rotor assembly being journalled for rotation within the stator. Further, the stator assembly includes a cylindric shell, as indicated at 7, enclosing the core, and the winding, and the majority of rotor assembly 5. End shields 9 are fitted to the ends of the shell and function as bearing support members for journalling rotor assembly 5. A plurality of so-called through bolts 11 extend longitudinally through the motor from one end shield through the core to the other end shield and thus securely hold the end shields in the shell in desired location on the stator core. Rotor assembly 5 has a rotor shaft 13 extending endwise out beyond end shield 9 and this rotor shaft is journalled in bearings 15 carried by the end shields. As described above, motor 1 is conventional and the details of construction are widely known to those skilled in the motor art.

Figure 3:
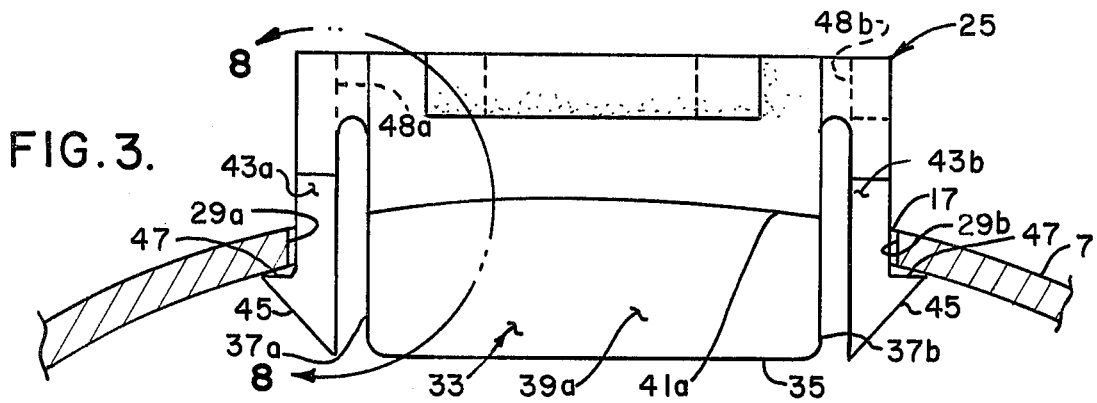
FIG. 3 is a cross-sectional view on an enlarged scale taken along line 3—3 of FIG. 2 illustrating a portion of the shell of the motor with a receptacle portion of the terminal housing of the present invention being inserted within the opening in the shell.

Further, a so-called passthrough opening 17 (see FIG. 3) is provided in shell 7 for enabling a plurality of electrical lead wires, as indicated at 19A–19C, to be electrically connected to respective electrical terminals 21A–21C electrically connected to the windings of the motor for energization thereof with the terminals 21A–21C being mounted within a compartmentized, insulated terminal housing of the present invention, as generally indicated at 23, installed within opening 17 in motor shell 7. More specifically, terminal housing 23 is shown to comprise a receptable 25 and a cover 27 installable on the receptacle with both the receptacle and the cover preferably being molded of a suitable synthetic resin, insulative material.

Figure 2:
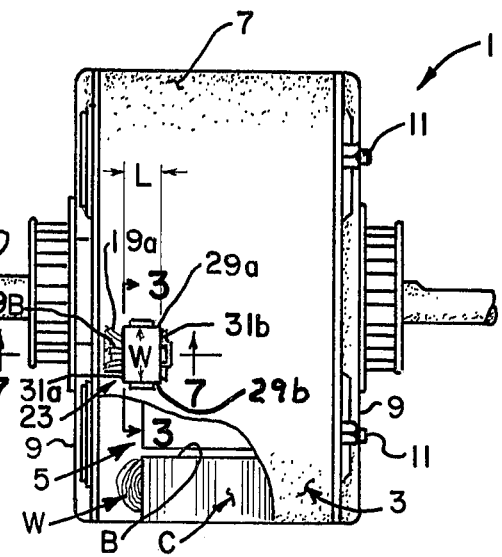
FIG. 2 is a side elevational view of FIG. 1.

As heretofore explained, shell 7 is shown to be a generally cylindric member of relatively heavy gauge sheet metal or the like and, as best shown in FIG. 2, slot or opening 17 in the shell is generally a rectangular opening having side edges 29a, 29b extending generally parallel to the cylindric center line of the motor and further having end edges 31a, 31b extending generally perpendicular to the center line of the motor with the end edges 31a, 31b being generally arcuate. As shown in FIG. 2, slot or opening 17 has a length L extending longitudinally in the direction of the centerline of the motor and a width W.

Housing receptacle 25 comprises a receptacle body 33 having a bottom or base wall 35, sidewalls 37a, 37b and end walls 39a, 39b. With receptacle body 33 inserted in opening 17, sidewalls 37a, 37b are intended to be disposed adjacent side edges 29a, 29b of opening 17 and end walls 39a, 39b are disposed adjacent the end edges 31a, 31b of the opening. As generally indicated at C, a chamber is provided within receptacle body 33. Further, end walls 39a, 39b each include a respective arcuate shoulder 41a, 41b with the arcuate shoulders being engageable with the outermost surface of shell 7 adjacent end edges 31a, 31b when receptable body 33 is inserted into the opening thereby to prevent inward movement of the receptacle body beyond the location of arcuate shoulders 41a, 41b.

Further, receptacle body 33 includes a pair of fingers 43a, 43b located on opposite sides of the receptacle body with each of these fingers including means thereon for retaining the receptacle body within opening 17 and for preventing removal of the receptacle body from shell 7. More specifically, these retaining means are shown to comprise a beveled camming surface 45 on the outside lower end of each of the fingers 43a, 43b with a barb or shoulder 47 extending outwardly from the outer face of the fingers and being engageable with the inner face of the shell adjacent side edges 29a, 29b of opening 17. For purposes as will appear, respective openings or apertures 48a, 48b are provided between within receptacle body 33 between the inner faces of fingers 43a, 43b and the side walls 37a, 37b of the receptacle body.

Further, receptacle body 33 includes a retaining bracket, as indicated at 49, with the latter defining an opening 50 therewithin. Also, a so-called closure bracket 51 is provided on the receptacle body with the closure bracket 51 defining an opening 52 therewithin for purposes as will appear.

Additionally, cover 27 includes a cover base, as generally indicated at 53, and a lid 55 hingedly connected to the cover base by means of a pair of hinges 57 for hingedly swinging between an open position (as shown in FIG. 6) in which the lid is swung clear of the cover base and a closed position (as shown in FIG. 7) in which the lid overlies the cover base and thus at least in part encloses chamber C within receptacle body 33. Cover base 53 includes a single member 59 to which hinges 57 are attached and a pair of side members 61a, 61b extending outwardly from the cover base so that the cover base forms a generally U-shaped member as best shown in FIG. 5, this U-shaped member being intended to bear on three of the upper surfaces of receptacle body 33. Each side member 61a, 61b has a respective lug 63a, 63b depending downwardly therefrom for purposes as will appear. A retaining finger 65 is integrally molded with central member 59 and extends downwardly below the central member for reception in opening 50 of retaining bracket 49 provided on receptacle body 33. As best shown in FIG. 6, retaining finger 65 has an upwardly facing shoulder 67 thereon and an inclined camming face 69. It will be understood that as cover base 53 is fitted on the upper edges of receptacle body 33 in a manner as will be more fully explained hereinafter retaining finger 65 is inserted into opening 50 and the inclined face 69 engages a portion of retaining bracket 49 thereby to deflect finger 65 relative to the cover base so as to permit the retaining finger to be received in opening 50. As the bottom faces of the cover face come into engagement with mating upper surfaces of the receptacle body, shoulder 67 moves downwardly clear of retaining bracket 49 and the finger 65 resiliently snaps back to its normally free position, as shown in FIG. 6, and thus shoulder 67 is engageable with a portion of the retaining bracket 49 thereby to prevent withdrawal of the cover assembly from receptacle body 33. In this manner, retaining finger 65 constitutes means for securing the cover onto the receptacle.

Lid 55 includes a pair of latching fingers 71a, 71b extending downwardly from the front edge of the lid when the lid is closed (see FIG. 7) so as to be received in opening 52 of closure bracket 51. Further, each of these latch fingers 71a, 71b includes a retaining shoulder 73 engageable with the lower edge of closure bracket 51 thereby to positively retain the lid in its closed position. Further, lid 55 includes a pair of spaced apart partitions 75 for purposes as will appear.

Figure 4:
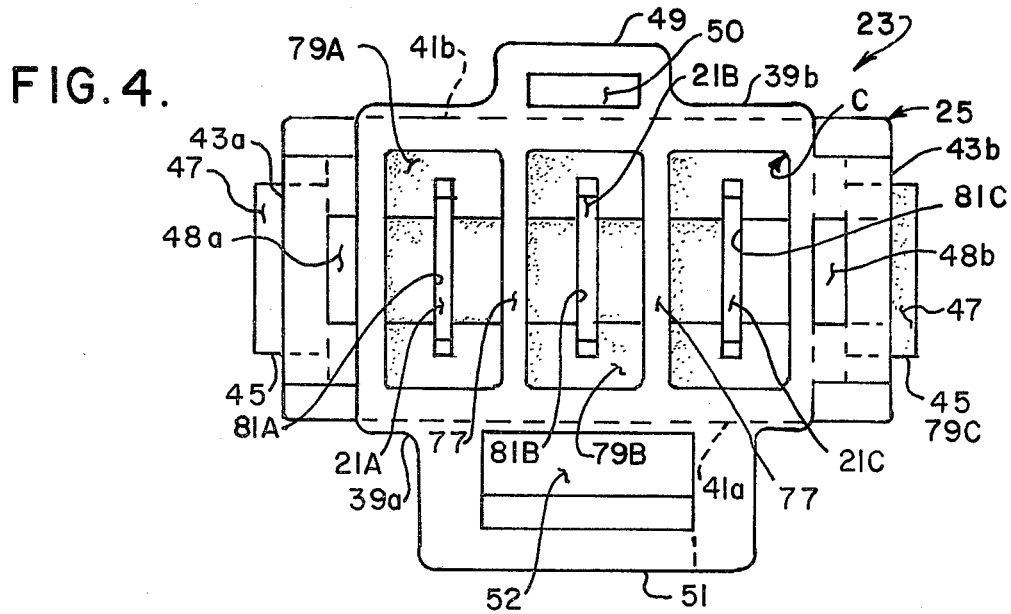
FIG. 4 is a top elevational view of the receptacle shown in FIG. 3.

Referring to FIG. 4, receptacle body 33 is found to comprise a pair of spaced partitions 77 within chamber C so as to divide the chamber into three compartments, as indicated at 79A, 79B and 79C. Partitions 77 are generally in register with corresponding partitions 75 of lid 55 when the latter is closed (FIG. 7) such that the compartments 79A-79C are in register with like compartments formed in lid 55 when the latter is in its closed position. Each of the compartments 79A-79C has a respective slot 81A-81C in its respective base wall 35 with each of these slots being adapted to receive a respective male electrical terminal blades 21A-21C electrically connected to the windings W of motor 1. As is typical, each of the male terminal blades includes a retaining barb 85 (see FIG. 7) permitting the terminal blade to be inserted through its respective slot 81A-81C from the bottom thereof and so as to prevent withdrawal of the terminal blade from its respective compartment once the retaining barb has passed through the slot. In other words, the retaining barb 85 bears on the inner face of base wall 35 adjacent its respective slot and prevents withdrawal of the terminal blade into the motor. In this manner, it will be appreciated that each of the terminals 21A-21C is secured in place within its respective insulated compartment 79A-79C within terminal housing 23 and is electrically insulated from shell 7 by the terminal housing.

As is best shown in FIGS. 4 and 7, each terminal compartment 79A-79C is of sufficient size so as to readily accommodate its respective winding terminal 21A-21C and further is of sufficient size so as to accommodate a female electrical terminal 87A-87C electrically connected to a respective lead wire 19A-19C. Additionally, with lid 55 in its closed position with latching fingers 71a, 71b received in opening 52 of closure bracket 51, lead wires 19A-19C will extend outwardly from the compartmentized insulated terminal housing 23 of the present invention and each of the male terminals 21A-21C together with the female terminals 87A-87C on lead wires 19A-19C will be physically separated from one another by partitions 77 of receptacle body 33 and by partitions 75 of lid 55.

Further in accordance with this invention, it will be noted that as cover base 53 is installed on receptacle body 33 as heretofore described (that is, with retaining finger 65 being received in opening 50 of retaining bracket 49), retaining lugs 63a, 63b will be fitted into respective openings 48a, 48b in the upper portion of receptacle body 33 (see FIG. 8). The thickness of retaining lugs 63a, 63b is such as to prevent inward movement of retaining fingers 43a, 43b inwardly toward the respective sidewalls 37a, 37b of receptacle body 33 thereby positively maintaining the retaining fingers in their outwardly retaining positions with the shoulders 47 at the lower ends of the retaining fingers being positioned to engage the inner surface of motor shell 7 and thereby to positively prevent the withdrawal of receptacle body 33 from opening 17 in the motor shell. In this manner, even with lid 55 open, the lid will remain secured to the receptacle body and it will be difficult to remove the receptacle body from the opening within the shell.

It will be understood that appropriate labels and markings can be provided in housing 23 so as to identify each of the windings terminals 21A-21C. Thus, when lead wires 19A-19C are desired to be connected to the terminals, service personnel and other persons making the connections will have little difficulty in identifying which lead wires should be connected to which terminals, depending on the voltage at which the motor is to be operated and the direction of rotation of the motor.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. In a dynamoelectric machine comprising a stator and a rotor, said stator having a winding therein, a shell surrounding said winding, at least one terminal connected to said winding for the electrical connection of a selected electrical lead to said winding, an opening in said shell, wherein the improvement of this invention comprises: a terminal housing installable in said opening in said shell, said housing comprising a receptacle and a cover, said receptacle being received within said opening and having at least one compartment therewithin, said compartment having a base wall with a slot therein for receiving a respective said terminal, said receptacle having a pair of fingers, one at opposite sides thereof, attached to the upper portion of said receptacle and spaced from its respective adjacent sidewall of the receptacle, said fingers having retaining means engageable with said shell when said receptacle is installed within said opening thereby to prevent removal of said receptacle from said opening, said fingers being flexibly movable between a retaining position in which said retaining means is engageable with said shell and a retracted position in which said receptacle may be readily inserted within said opening, said cover having a base, a lid hingedly attached to said base, said lid being movable between an open position in which access may be had to said compartments within said receptacle and a closed position in which said lid overlies said compartments within said receptacle, said receptacle having a pair of apertures therein, one aperture adjacent each of said fingers, said cover base having a pair of lugs carried thereby insertable into said apertures after said receptacle has been inserted into said opening thereby to maintain said fingers in their retaining positions and for positioning said cover on said receptacle.

2. In a dynamoelectric machine as set forth in claim 1 wherein said receptacle has a chamber therewithin, said receptacle having at least one partition dividing said chamber into a plurality said compartments, one for each of said terminals.

3. In a dynamoelectric machine as set forth in claim 1 wherein said cover has means thereon for securement of said cover to said receptacle.

4. In a dynamoelectric machine as set forth in claim 2 wherein said cover assembly lid has at least one partition thereon in register with said partition within said receptacle so that said lid is divided into compartments generally in register with the compartments in said receptacle.

5. In a dynamoelectric machine as set forth in claim 4 wherein said lid carries securement means engageable with said receptacle when said lid is moved from its open to its closed position thereby to securely hold said lid in its closed position.

6. In a dynamoelectric machine as set forth in claim 1 wherein said compartment within said receptacle includes a base wall and wherein each of said base wall has a slot therein for reception of a respective winding terminal.

7. In a dynamoelectric machine as set forth in claim 1 wherein said receptacle and cover are of a suitable electrical insulative synthetic resin material.

8. In a dynamoelectric machine as set forth in claim 1 wherein said receptacle has at least one arcuate shoulder engageable with the outer surface of said shell adjacent said opening thereby to limit inward movement of said receptacle into said shell.

9. A compartmentized, electrical insulative housing for a plurality of terminals installable in an opening in the shell of a dynamoelectric machine or the like, said terminal housing comprising a receptacle and a cover, said receptacle being received within said opening and having a plurality of compartments therewithin, one for each of said terminals, each of said compartments receiving a respective said terminal, said receptacle having a pair of fingers, one at opposite sides thereof, attached to said receptacle and spaced from the receptacle, said fingers having retaining means engageable with said shell when said receptacle is installed within said opening thereby to prevent removal of said receptacle from said opening, said fingers being flexibly movable between a retaining position in which said retaining means is engageable with said shell and a retracted position in which said receptacle may be readily inserted within said opening, said cover having a base, a lid hingedly attached to said base, said lid being movable between an opening position in which access may be had to said compartments within said receptacle and a closed position in which said lid overlies said compartments within said receptacle, said receptacle having a pair of apertures therein, one aperture adjacent each of said fingers, said cover base having a pair of lugs carried thereby insertable into said apertures after said receptacle has been inserted into said opening thereby to maintain said fingers in their retaining positions and for positioning said cover on said receptacle.

* * * * *